Sept. 11, 1962      B. MICHAELS      3,053,465

MOTION PICTURE APPARATUS

Filed May 21, 1959      7 Sheets-Sheet 3

INVENTOR.
Bruno Michaels
BY
Robert F. Miehle
Atty.

United States Patent Office 3,053,465
Patented Sept. 11, 1962

1

3,053,465
MOTION PICTURE APPARATUS
Bruno Michaels, Chicago, Ill., assignor to Bell & Howell Company, Chicago, Ill., a corporation of Illinois
Filed May 21, 1959, Ser. No. 814,894
9 Claims. (Cl. 242—55.11)

This invention relates to motion picture apparatus, and more particularly to a self-latching take-up in a motion picture projector.

Motion picture projectors have been provided which automatically thread the film through the sprocket and gate structure. However, hitherto there has been no satisfactory apparatus which would automatically secure film to a take-up reel after the threading operation.

An object of the invention is to provide a self-latching take-up in a motion picture projector.

Another object of the invention is to provide a take-up reel having low inertia latching portions which will move when initially engaged with film to prevent shock to the film.

Another object of the invention is to provide a projector having means for guiding perforated film from the film transport into a spoked take-up reel and twisting the leading end of the film into the path of the spokes of one flange so that the spokes will hold the leading end of the film against curling and guide the film to latching tabs on the hub which automatically engage the film to latch the film to the hub.

Another object of the invention is to provide a film guide in the path of film fed from a sprocket of a projector for twisting the leading end of the film and guiding the leading end of the film between the flanges of a take-up reel and into engagement with spokes of one of the flanges which keep the leading end from curling and cause it to come tangentially into engagement with the hub and be latched by latching elements of the hub.

Another object of the invention is to provide a motion picture projector reel having a hub and a latching element normally moved with the hub but movable relative to the hub by the application of sudden force thereto as occurs when a film being fed more slowly than the hub is engaged by the latching element.

Another object of the invention is to provide a motion picture reel having a hub and a peripheral band slidably on the hub and frictionally engaging the hub, the band having latching tabs alternately directed forwardly and to the rear relative to the direction of movement of the periphery of the hub.

A complete understanding of the invention may be obtained by the following detailed description of motion picture apparatus forming specific embodiments thereof, when read in conjunction with the appended drawings, in which.

The invention provides novel motion picture apparatus including a reel having means for automatically latching the leading end of a film advanced thereto. Preferably, the reel is driven by a slipping clutch tending to drive the reel hub faster than the film is advanced theretoward and the latching means is a light weight band frictionally engaging the hub and slidable on the hub when the film is first latched to prevent application of shock to the film. Preferably, the inner face of one flange of the reel is provided with film catching portions such as spokes and there is a guide near the periphery of the reel for directing the leading end of the film between the reel flanges and twisting the leading end of the film into engagement with the film catching portions which prevent the leading end of the film from curling away from the hub and latching means on the hub. Preferably, the guide twists the film in a direction such that a perforated edge of the film engages the hub and latching means first to insure engagement of the latching means with the perforated portion of the film. The guide may be in a position to receive film directly from the lower sprocket of a projector and guide the film chordally relative to the hub of the reel, and may have a roller engaged by the back of the film when the film is latched and swinging the guide outwardly as the film builds up on the reel.

Referring now in detail to the drawings, a motion picture projector 20 (FIG. 1 through 9) includes a supply reel 21 from which a film 22 is advanced by an upper sprocket 23 through a loop former 24 to gate 25 having a known intermittent film transport or shuttle (not shown). The film travels from the gate past a loop former 18 to lower sprocket 26, which advances the film continuously along a channel or guide 19 U-shaped in cross-section, to a sprocket 27 driven in synchronism with the sprockets 23 and 26. The sprocket 27 feeds the film through a guide 28, which twists the leading end of the film and guides the film between flanges 29 and 30 of a take-up reel 31. The twist in the film causes the leading end thereof to go slightly into one of the recesses between radial spokes 30a of the flange 30 to engage the leading end and keep the leading end from curling away from hub 32 of the reel 31, which is identical with the reel 21. A latching band 33 frictionally engaging the periphery of the hub has teeth 33a which latch into the perforations 22a in the film to latch the film to the reel. Normally, the reel 29 is driven, by a known slipping drive (not shown) as is conventional for projector take-up reel drives, at a rate of speed such that the periphery of the hub moves about twice as fast as the feed of the film by the sprockets. Hence, as the film latches into the band 33, the inertia of the reel 31 and its drive normally would apply a large tensioning force or shock to the film. This shock is obviated by the band 33 being of low inertia and being only in frictional engagement with the hub so that it slows the reel gradually to the speed of the film, normally a slippage of approximately one quarter of an inch occurring while latching in eight millimeter film advanced at sixteen frames per second.

The sprocket 27 is driven in synchronism with the sprockets 23 and 26 and is suitably journaled on a horizontal axis in vertical frame plate 41, which also mounts the other elements. The guide channel 19 is open at the side to permit withdrawal of the film during editing, and, during threading, the sprocket 26 feeds the leading end of the film 22 along the channel and under the sprocket 27 which latches into the film, a roller 42 holding the film in engagement with the sprocket 27 and turning the film into the guide 28. The film is in a horizontal plane as it arrives at the sprocket 27. The guide 28 is pivotally mounted on horizontal pin 43 (FIG. 3), and is urged by torsion spring 44 in a clockwise direction, as viewed in FIG. 2, toward a normal starting or latching position, a stop pin 45 on the frame 41 extending through slot 46 in arm 47 of the guide to limit the clockwise movement of the guide 28. The guide 28 has a channel portion defined by a tilted plate or twister 48, a side plate 49 and a cover or retaining plate 50. The guide has a lower mounting tab 51 and also a roller mounting tab 52 having a hole 53 therein.

Figure 1:
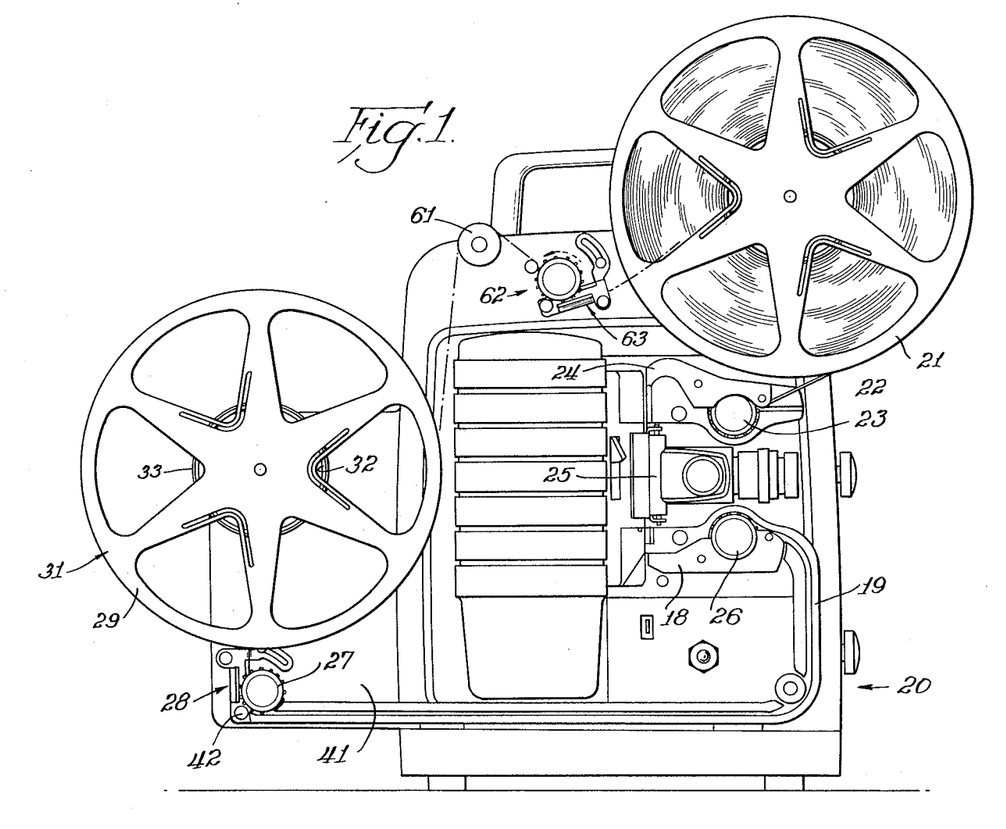
FIG. 1 is a side elevation view of a motion picture projector including apparatus forming one embodiment of the invention.
Figures 2, 3, 4:
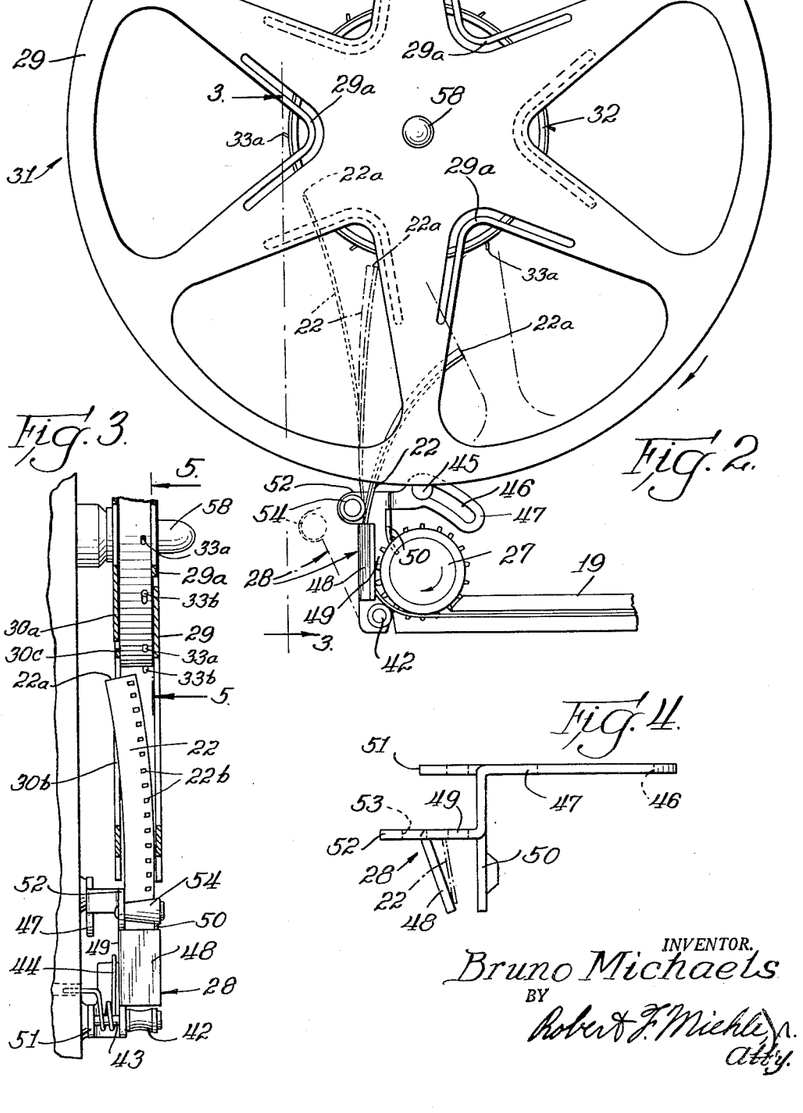
FIG. 2 is a fragmentary, enlarged side elevation view of the projector shown in FIG. 1.
FIG. 3 is an enlarged, partially sectional view taken along line 3—3 of FIG. 2.
FIG. 4 is a view taken along line 4—4 of FIG. 3.
Figure 5:
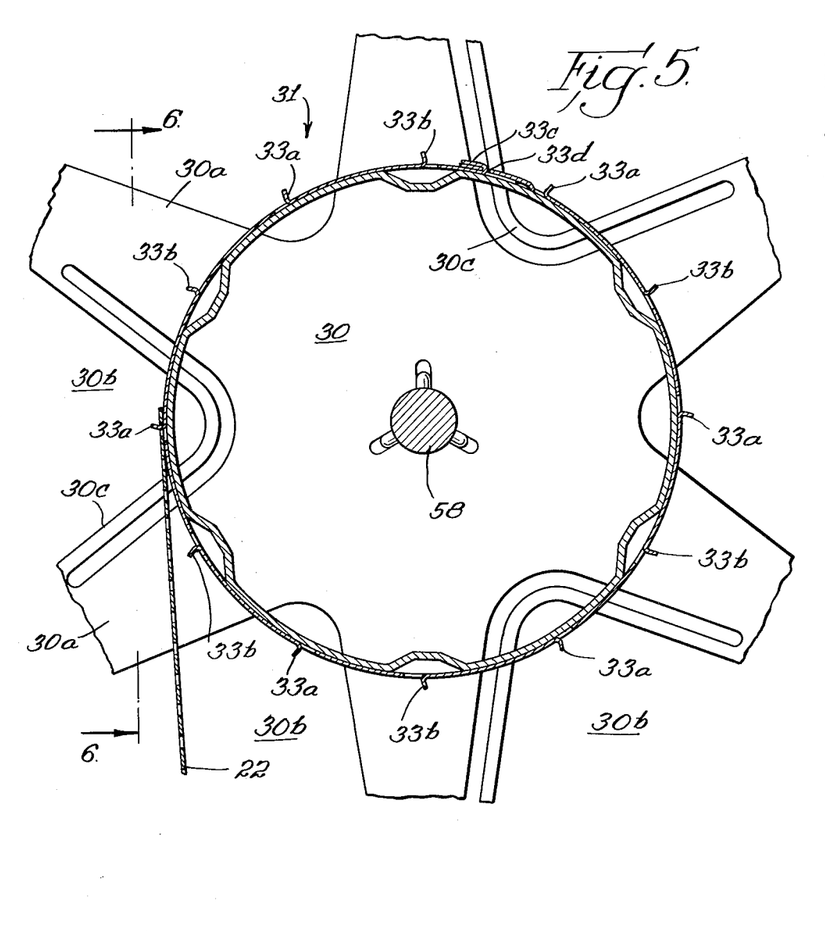
FIG. 5 is an enlarged vertical sectional view taken along line 5—5 of FIG. 3.
Figure 6:
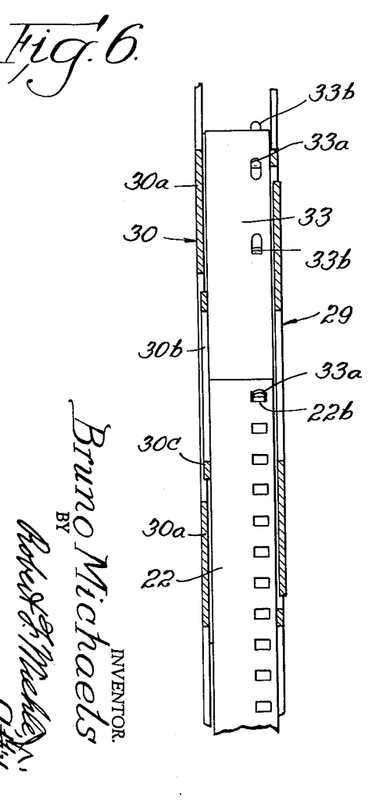
FIG. 6 is an enlarged partially sectional view taken along line 6—6 of FIG. 5.

As the leading end 22a of the film enters the guide 28, only the perforated edge of the film engages the tilted plate 48 and the tilted plate twists the film from a position parallel to the plate 50 to the position shown in FIGS. 2, 3 and 4, the side plate 49 keeping the film from traveling or creeping upwardly, as viewed in FIG. 4. The guide 28 also includes an exit guide roller 54 opposing the exit end portion of the retaining plate 50 and these opposed guide members are spaced closely to the periphery of the reel 31, preferably about one-eighth of an inch. The guide 28 guides the leading end of the film between the flanges in a chordal direction relative to the hub 32 just inside the tangential direction so that the leading end of the film is sure to strike the band 32. However, the film has a natural tendency to curl clockwise as viewed in FIG. 2, particularly film from a small supply reel, and to insure that the leading end of the film travels on up to the band 33 and is automatically latched thereto, the guide 28 twists the film as described above to urge the unperforated edge of the film against the flange 30 after the leading edge has entered between the flanges 29 and 30. This causes the unperforated edge of the film to enter openings 30b between the spokes 30a of the flange as the reel 30 rotates clockwise, as viewed in FIG. 2, and illustrated in FIG. 3. The spokes 30a then successively catch the leading end of the film and carry it against its curl to the left, as viewed in FIG. 2, and as the leading end travels upwardly from the feed of the sprocket 27, the film engages the band slightly chordally and one of the tabs or teeth 33a enters the first perforation 22b and latches the film in. It should be noted that the twist in the film is in a direction causing the perforated edge of the film to engage the band 33 before the unperforated edge engages the band to insure latching in. Also, the inner portions of the openings 30b extend inwardly beyond the periphery of the band so that the spokes 30a are operative to move the leading edge of the band against the curl of the film to the left, as viewed in FIG. 2, until the right-hand face of the film engages the band and is latched thereto.

The hub 32 has spaced, transverse grooves, recesses or depressions 32a which the band 33 extends somewhat chordally across to provide an irregular or non-circular periphery imparting resistance against slipping of the band on the hub. This, with the friction between the band and the hub and the friction between the edges of the band and V-shaped flange springs 30c and 29a, provide a static resistance to slipping of the band somewhat greater than the output of the known clutch (not shown) driving spindle 58 to which the reel is keyed. However, when the more slowly fed film is latched by one of the tabs 33a, the sudden pull on the band overcomes this resistance, the inertia of the reel causing it to slip relative to the band until slowed by the friction between the band and the reel. The force between the band and the reel is quite low and the inertia of the band is low so that shock to the film also is prevented. Since the band travels approximately twice as fast as the film before latching, only a very few evenly spaced teeth on the band are needed to have one always in a position to enter and latch to the forward perforation 22b in the film. Preferably six evenly spaced tabs 33a are provided facing in the same direction. The tabs 33a and an equal number of oppositely facing rewind latching tabs 33b provided for use of the reel as the supply reel are so spaced that when the film is latched by one of the tabs 33a, the perforations behind the latched perforation are not in a position to move over any of the other tabs 33a or any of the tabs 33b. The tabs 33a and 33b are so short that the film resting thereon does not appreciably affect the build-up of film thereover, and since only the one tab 33a is latched, when the film is rewound there is no difficulty in separating the film from the band 33 as there might be if more than one tab were latched to the film.

Figures 7, 8, 9:
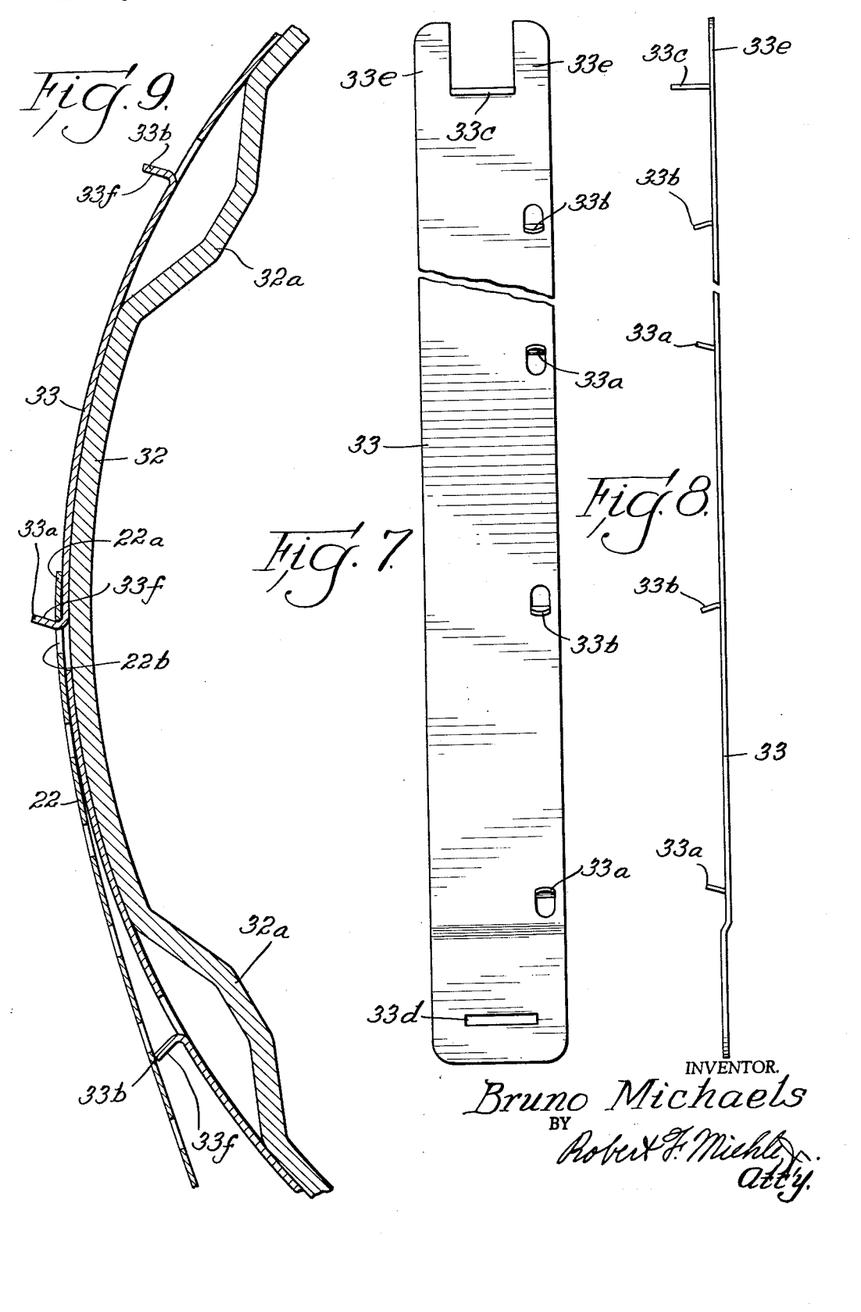
FIG. 7 is an enlarged, fragmentary, developed view of a film-latching band adapted to be frictionally mounted on the hub of a reel.
FIG. 8 is a side elevation view of the band shown in FIG. 7.
FIG. 9 is a fragmentary, enlarged, vertical sectional view of the hub of the reel and the film-latching band shown in FIG. 5.

As illustrated in FIGS. 7 and 8, the film latching or arresting band 33 may be mounted on any reel and includes a tongue 33c at one end adapted to enter slot 33d in the other end portion which is offset the thickness of the band. The tongue 33c is bent over flat on the other end to lock the band on the reel. Side end fingers 33c project under the other offset end portion to support the offset end portion. The tabs 33a and 33b preferably are formed by punching them out of the band, and are bent somewhat over 90° out of the plane of the band. By this technique, corner edges 33f, which must be free of burrs, are smooth and burr-free even without subsequent grinding operations. During feed of the leading end 22a to the hub, the roller 54 (FIGS. 2 and 3) provides an abutment on the left-hand side of the film to support the film as the film is moved by the spokes 30a, which, in their action on the leading end of the film, are projections. Then, as the film is latched to the reel 31, the left-hand side of the film engages the roller which provides a smooth exit from the guide 28 to the reel 31 during winding. As the film builds up on the reel 31, the film presses the roller 54 and guide 28 to the left against the spring 43 so that the guide 28 extends substantially tangentially to the periphery of the film build-up on the reel 31.

For rewinding on to the reel 21 film wound completely on the reel 31, the leading end of the film to the supply reel 21 is passed over roller 61 (FIG. 1) and threaded under sprocket 62 which then advances the film through a guide 63 which is identical with but oppositely directed relative to the guide 28. The guide 63 twists the film and directs it chordally into the reel 21, which latches on to the film, the automatic latching operation being the same as with the reel 31 during forward operation of the projector. The guide 63 feeds the film somewhat more chordally relative to the hub of the reel 21 than the chordal direction of the guide 28 inasmuch as the feed of the end of the film by the guide 63 is substantially horizontal while that of the guide 28 is substantially vertical.

Figure 10:
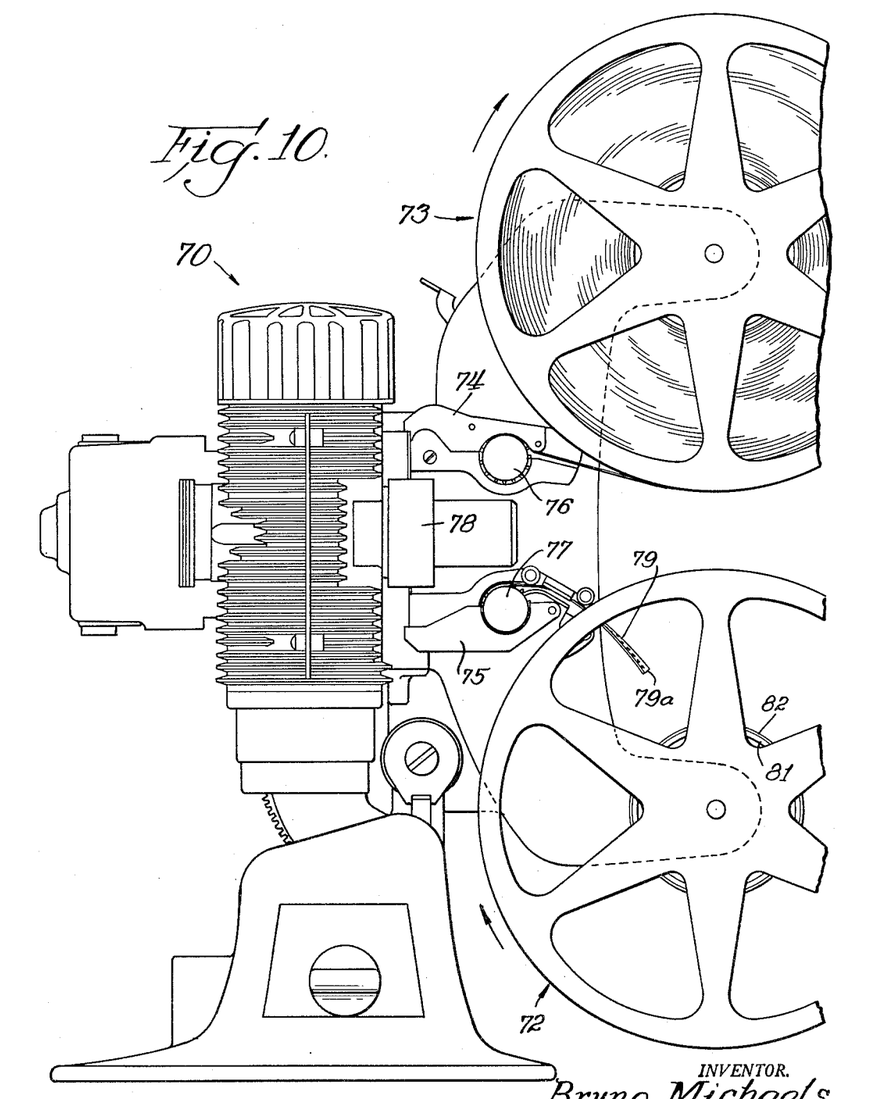
FIG. 10 is a fragmentary, side elevation view of a motion picture projector forming an alternate embodiment of the invention.
Figure 11:
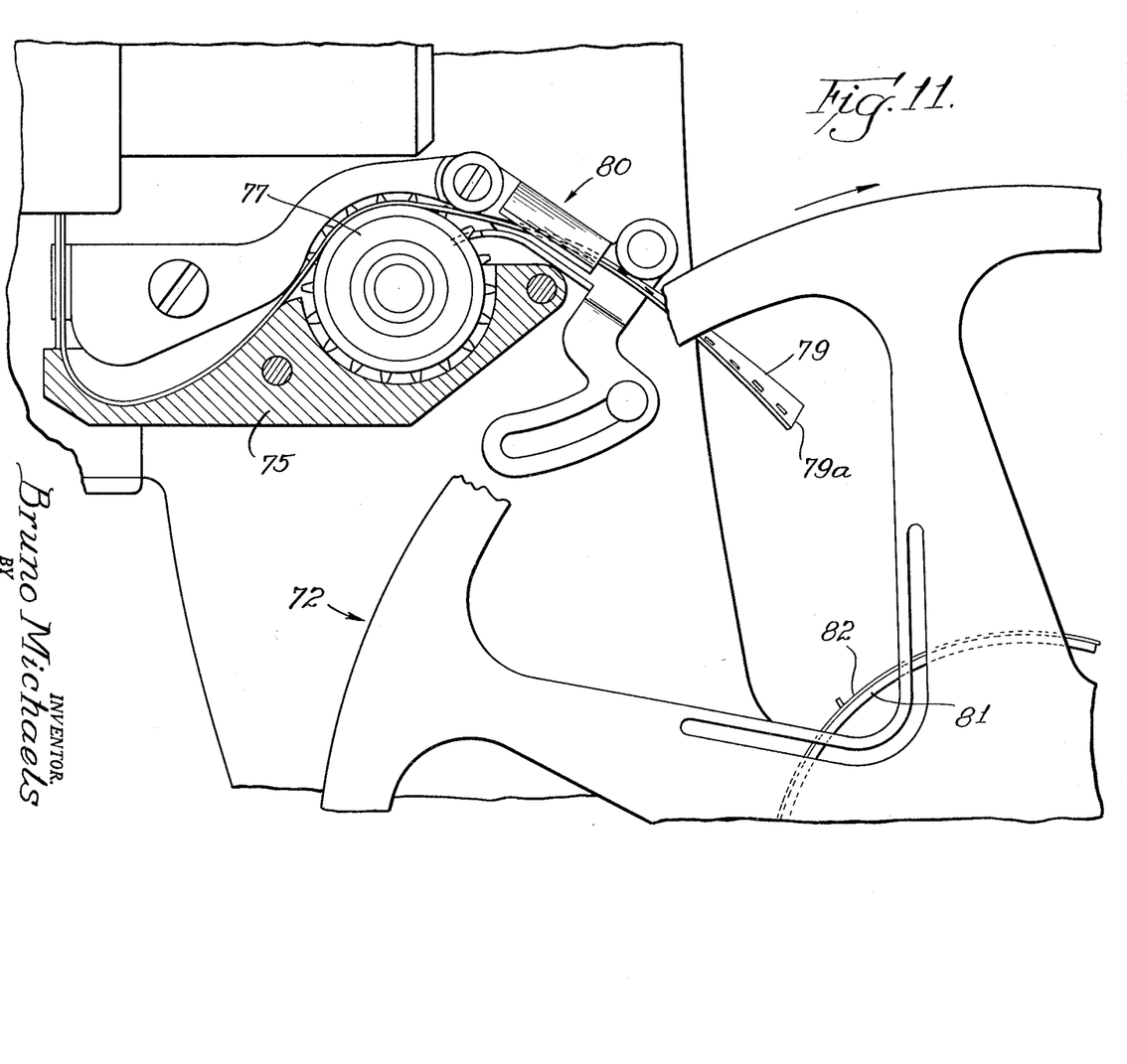
FIG. 11 is an enlarged, fragmentary, partially sectional, side elevation view of the projector shown in FIG. 10.

A projector 70 shown in FIG. 10 forming an alternate embodiment of the invention is of the type having a take-up reel 72 directly below supply reel 73. The projector has known automatic threading loop formers 74 and 75, upper and lower feed sprockets 76 and 77 and a gate 78 with a known intermittent film transport or shuttle (not shown). The sprocket 77 feeds the leading end 79a of the film 79 into and through a guide 80 similar to the guide 28 but swung approximately 120° relative to the guide 28. The guide 80 directs the leading end of the film between the spoked flanges of the reel and twists the film so that the unperforated edge thereof tends to enter between the spokes of the back flange of the reel which is driven clockwise by a clutch driven spindle 81. The leading end is advanced almost tangentially toward hub 81 of the reel which has band 82 frictionally mounted thereon. The reel 72 is identical in construction with the reels 21 and 31, and the film is latched thereto by the band 82 thereof. If desired, a trigger may be mounted at the exit of the film from the sprocket 77 to release the loop formers 74 and 75.

Projector 91 (FIGS. 12, 13 and 14) forming an alternate embodiment of the invention includes a supply reel 92, upper sprocket 93, gate 94 having a known intermittent film transport (not shown), a reverse lower loop former 95, a lower sprocket 96, a guide 97 and a latching take-up reel 98 identical with the reel 31 and driven by clutch driven spindle 99. In threading the leading end 100a of the film 100 through the projector and latching the end to the take-up reel all automatically, the operator presses the upper loop former counter-clockwise and it latches in loop forming position, a linkage between the loop formers 93 and 95 moving the lower loop former counter-clockwise to loop forming position. The leading end of the film then is introduced to the sprocket 93 which feeds it to the gate through the loop former. The intermittent film transport feeds the film into the lower loop former 95 and to the lower sprocket 96, which feed the leading edge into the channel-like guide 97. The guide 97 feeds the leading end of the film into the reel 98 chordally relative to the hub thereof and twists the film to project the unperforated edge of the leading end into the path of the spokes of the back flange of the reel which successively flick the leading end to the left until it comes into tangential engagement with the latching band of the reel and is latched to the reel.

Figures 12, 13, 14:
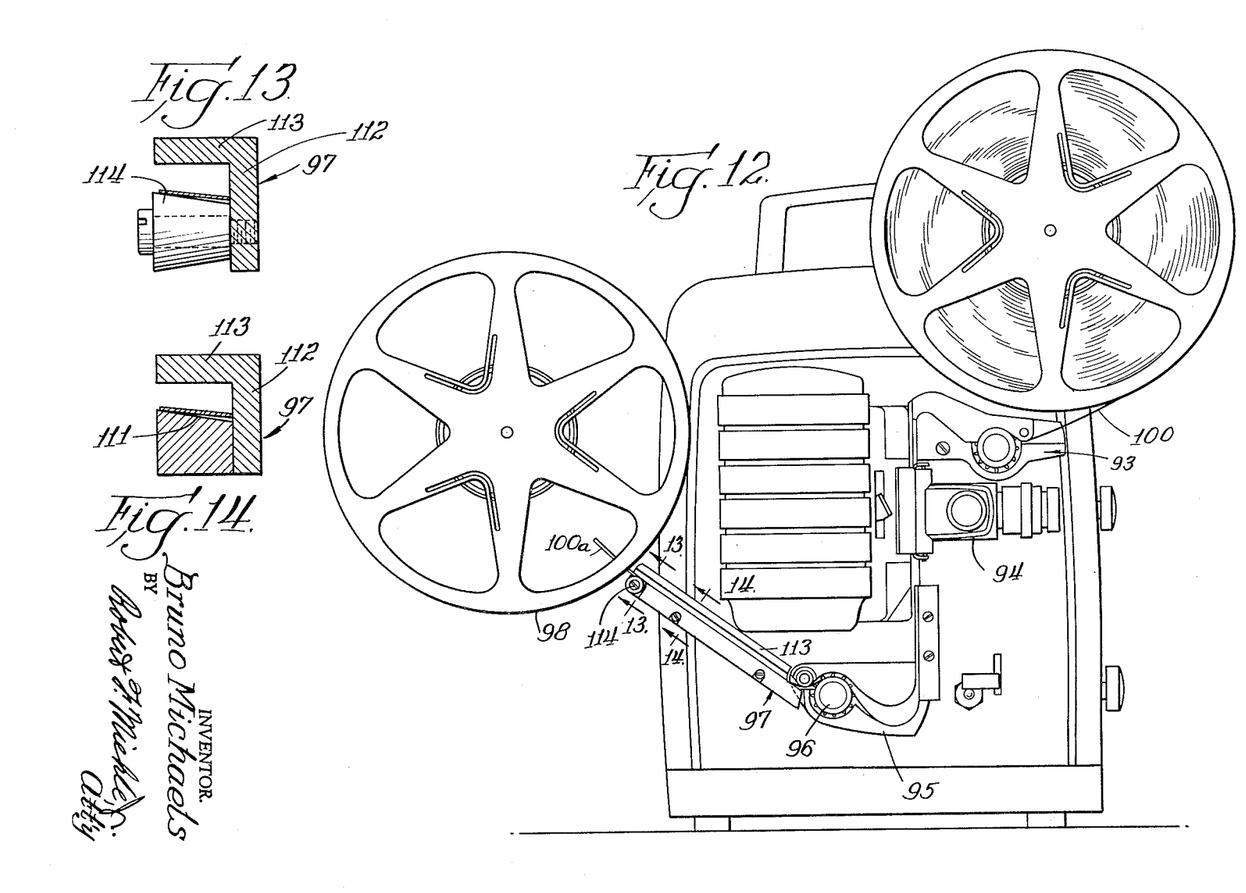
FIG. 12 is a fragmentary, side elevation view of a motion picture projector forming another embodiment of the invention.
FIG. 13 is an enlarged vertical sectional view taken along line 13—13 of FIG. 12.
FIG. 14 is an enlarged vertical sectional view taken along line 14—14 of FIG. 12.

The guide 97 is generally similar to the guide 28, and has tilted bottom guiding surface 111, side guide 112 and top cover or guide 113. Tapered exit roller 114 guides the film to the reel after the film has been latched in and acts as a frictionless guide for the film.

The above described projectors automatically thread and latch in the film so that the film needs only be started and no manual effort is involved in both threading and latching in.

While the invention is thus described, it is not wished to be limited to the precise details described, as changes may be readily made without departing from the spirit of the invention.

What is claimed is:

1. In a motion picture projector, a rotated take-up reel having hub means provided with film latching means and also provided with a pair of flanges of which at least one has recesses in the wall thereof, means for pushing the leading end of a film toward the reel, and guide means for guiding the leading end of the film between the flanges and twisting the film about the longitudinal axis thereof so as to tend to push one edge of the leading end of the film into the recesses in said one of the flanges so that the leading end is momentarily caught and moved by the flange each time the edge enters one of the recesses, the guide means being directed so as to guide the portion of the film leaving the guide means in a chordal direction relative to the hub.

2. In a motion picture projector, a film pushing means for advancing film, a reel having spoked flanges and also having hub means provided with latching means, guide means extending from the film pushing means to a point adjacent to the periphery of the reel for directing the leading end of the film into the space between the flanges and toward the hub means, the guide means serving to twist the film about its longitudinal axis so that any curl in the leading end of the film causes one edge of the film to be engaged by the spokes of one of the flanges, and means for rotating the reel in a direction tending to straighten the curl in the film as the spokes engage the leading end of the film.

3. In a motion picture projector, gate means, means for feeding film from the gate means in a predetermined plane, a take-up reel including spoked flanges and hub means having latching means for latching the leading end of the film to the hub, means for rotating the reel and guide means receiving the film from the feeding means and directing the film into the space between the flanges in a direction slightly chordal relative to the hub means and slightly twisted so that curl in the leading end portion of the film tends to move one edge of the film against one of the spoked flanges.

4. In a motion picture projector, sprocket means rotatable on a predetermined axis for feeding film in a predetermined plane, a guide at the exit of the sprocket means and having a guide surface in the path of film advanced by the sprocket means, the guide surface being so positioned as to twist the film about the longitudinal axis of the film, and a reel positioned at the discharge end of the guide means and rotatable on an axis parallel to said predetermined axis, the reel having a flange and means on the flange for momentarily catching the edge of the leading end portion of the film when that portion is curled, the reel also being provided with means for automatically securing the leading end of the film to the hub when the leading end of the film arrives at the hub.

5. In a motion picture projector, a take-up spindle, means driving the spindle impositively, a take-up reel on the spindle and provided with latching means at the hub thereof and yieldably driven by the hub for automatically engaging a film brought into contact therewith, the spindle serving normally to rotate the reel at a predetermined peripheral speed of the hub, and means for feeding the leading end of the film to the hub at a rate of speed substantially slower than the peripheral speed of the hub, whereby the latching means is momentarily retarded relative to the hub when the film is engaged by the latching means.

6. In a motion picture projector, a take-up reel having a hub and a band having teeth on the periphery of the hub in frictional engagement therewith, a take-up spindle mounting the reel, means driving the spindle yieldably at a normal rate of speed such as to provide normally a predetermined peripheral speed to the band and hub, and means for advancing film toward the reel at a fixed rate of speed substantially less than that of the band, whereby, when the portion of the film between the band and the advancing means is tensioned suddenly, the band slips on the hub to prevent shock.

7. In a projector, a gate, a take-up reel mounted rotatably behind the gate and having automatically operable film securing means on the hub thereof, and a guide extending to a point near the periphery of the reel for guiding the leading end of a film into the reel in a direction such that the leading end of the film is engaged by the film securing means, the reel having at least one flange provided with radially extending spoke portions, the guide being provided with means for twisting the leading end portion of the film about the longitudinal axis thereof in a direction such that curl in the film moves one edge of the film against said flange so that the spoke portion engages the film successively and momentarily straightens the film as the leading end of the film travels toward the hub.

8. In a take-up reel, a hub, a pair of flanges; and a peripheral band slidable on the hub in restrained engagement with one of the hub and the flanges such as to require a predetermined force to slide the band on the hub, the band having at least one film securing portion, the hub having irregular portions for restraining movement of the band relative thereto.

9. In a take-up reel, a hub having transverse peripheral grooves, a pair of flanges, and a peripheral band slidable on the hub in restrained engagement and in close peripheral contact therewith such as to require a predetermined force to slide the band on the hub, the band having at least one film securing portion.

References Cited in the file of this patent

UNITED STATES PATENTS

| | | |
|---|---|---|
| 1,232,753 | Baluta | July 10, 1917 |
| 1,322,114 | Jenkins | Nov. 18, 1919 |
| 1,861,882 | Ross | June 7, 1932 |
| 2,503,453 | Pratt et al. | Apr. 11, 1950 |
| 2,592,285 | Hutchinson | Apr. 8, 1952 |
| 2,792,185 | Julliard | May 14, 1957 |

FOREIGN PATENTS

| | | |
|---|---|---|
| 264,931 | Switzerland | Feb. 16, 1950 |